(12) United States Patent
Mehansho et al.

(10) Patent No.: US 7,090,878 B2
(45) Date of Patent: Aug. 15, 2006

(54) MINERAL FORTIFIED WATER

(75) Inventors: Haile Mehansho, Fairfield, OH (US);
Renee Irvine Mellican, Bradenton, FL (US); Raul Victorino Nunes, Loveland, OH (US); Adrian Monsalve Marcano, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 273 days.

(21) Appl. No.: 10/247,190

(22) Filed: Sep. 19, 2002

(65) Prior Publication Data
US 2004/0058034 A1 Mar. 25, 2004

Related U.S. Application Data

(63) Continuation of application No. 10/150,328, filed on May 16, 2002, now abandoned.

(60) Provisional application No. 60/294,760, filed on May 31, 2001.

(51) Int. Cl.
*A23L 2/00* (2006.01)

(52) U.S. Cl. ............................ 426/66; 426/74
(58) Field of Classification Search .................. 426/66, 426/74
See application file for complete search history.

(56) References Cited

U.S. PATENT DOCUMENTS

| | | | |
|---|---|---|---|
| 3,003,388 A | | 10/1961 | Hunter et al. |
| 3,734,742 A | | 5/1973 | Morse et al. |
| 3,958,017 A | | 5/1976 | Morse et al. |
| 3,969,540 A | | 7/1976 | Jensen |
| 4,020,158 A | | 4/1977 | Ashmead et al. |
| 4,325,975 A | * | 4/1982 | Lindon et al. ............... 426/66 |
| 4,338,346 A | | 7/1982 | Brand |
| 4,399,163 A | | 8/1983 | Brennan et al. |
| 4,411,925 A | | 10/1983 | Brennan et al. |
| 4,423,029 A | | 12/1983 | Rizzi |
| 4,599,152 A | | 7/1986 | Ashmead |
| 4,786,510 A | | 11/1988 | Nakel et al. |
| 4,786,518 A | | 11/1988 | Nakel et al. |
| 4,822,847 A | | 4/1989 | Schulz et al. |
| 4,830,716 A | | 5/1989 | Ashmead |
| 4,863,898 A | | 9/1989 | Ashmead et al. |
| 5,008,120 A | | 4/1991 | Tanaka et al. |
| 5,435,894 A | | 7/1995 | Hayakawa |
| 5,516,925 A | | 5/1996 | Pedersen et al. |
| 5,707,670 A | | 1/1998 | Mehansho et al. |
| 5,797,216 A | * | 8/1998 | Reznik ................. 47/58.1 R |
| 5,824,353 A | * | 10/1998 | Tsunoda et al. ............ 426/66 |
| 5,851,578 A | | 12/1998 | Gandhi |
| 5,958,228 A | * | 9/1999 | Tokushima et al. ......... 210/199 |
| 6,074,675 A | | 6/2000 | Nanbu et al. |
| 6,120,812 A | * | 9/2000 | Harvey et al. ............. 426/66 |
| 6,261,610 B1 | * | 7/2001 | Sher et al. ................ 426/74 |
| 6,296,744 B1 | * | 10/2001 | Djeiranishvili et al. ..... 204/263 |
| 6,350,367 B1 | * | 2/2002 | West ..................... 205/775 |
| 6,361,715 B1 | * | 3/2002 | Reznik ................... 252/374 |
| 6,413,561 B1 | * | 7/2002 | Sass et al. ................ 426/74 |
| 6,461,652 B1 | * | 10/2002 | Henry et al. .............. 426/74 |
| 6,572,902 B1 | * | 6/2003 | Abramowitz et al. ........ 426/66 |
| 2002/0146486 A1 | * | 10/2002 | Yang et al. |
| 2003/0031757 A1 | * | 2/2003 | Akashe et al. |
| 2003/0049352 A1 | * | 3/2003 | Mehansho et al. |

FOREIGN PATENT DOCUMENTS

| | | |
|---|---|---|
| CN | 1101232 A | 4/1995 |
| CN | 1101263 A | 4/1995 |
| CN | 1104457 A | 7/1995 |
| CN | 1105549 A | 7/1995 |
| CN | 1210694 A | 3/1999 |
| CN | 1222318 A | 7/1999 |
| CN | 1233423 A | 11/1999 |
| DE | 197 00 368 A1 | 1/1997 |
| DE | 196 28 575 A1 | 1/1998 |
| DE | 198 35 718 A1 | 1/1999 |
| EP | 0 168 112 | 1/1986 |

(Continued)

OTHER PUBLICATIONS

U.S. Appl. No. 10/150,328, filed May 16, 2002, Mehansho et al.

(Continued)

*Primary Examiner*—Carolyn Paden
(74) *Attorney, Agent, or Firm*—Steven R. Chuey; Edward Milbrada; Dara M. Kendall

(57) ABSTRACT

A water composition that is fortified with at least one mineral and has a pH between about 2.5 and 9.5. The water composition has a redox potential that satisfies the following equation:

$$0 \geq RP - (A - B*pH)$$

wherein RP is the redox potential in millivolts of the mineral-containing water composition, pH is the pH of the mineral-containing water composition, A is 400 and B is 20. The mineral is preferably selected from calcium, iron, zinc, copper, manganese, iodine, magnesium, and mixtures of these. Moreover, the mineral-fortified water composition is preferably substantially free of flavor or sweetener compounds. Even more preferably, the water composition has no metallic taste or after-taste, a Hunter colorimetric "b" reading of less than 5.0, and an NTU turbidity value of less than 5.0. The mineral-fortified water composition may optionally contain other nutrients and vitamins, for example, vitamin A, vitamin C, vitamin E, niacin, thiamin, vitamin B6, vitamin B2, vitamin B 12, folic acid, selenium, and pantathonic acid.

3 Claims, No Drawings

FOREIGN PATENT DOCUMENTS

| | | |
|---|---|---|
| EP | 0 397 232 B1 | 3/1995 |
| FR | 2461463 | 2/1981 |
| JP | 03-224690 A | 10/1991 |
| JP | 05-244900 | 9/1993 |
| JP | 07-222571 | 8/1995 |
| JP | 07-274897 | 10/1995 |
| JP | 09-194356 | 7/1997 |
| WO | WO 91/12734 | 9/1991 |
| WO | WO 98/08401 | 3/1998 |
| WO | WO 98/48648 | 11/1998 |
| WO | WO 00/51446 | 9/2000 |

OTHER PUBLICATIONS

U.S. Appl. No. 10/367,006, filed Feb. 14, 2003, Daniels et al.

Hunter, R.S.—Photoelectric Color Difference Meter, Journal of the Optical Society of America, vol. 48, No. 12, Dec. 1958, pp. 985-995.

Cutrufelli, R. and Matthews, R.H.—Composition of Foods: Beverages Raw Processed Prepared—Agr. Handbook No. 8 Series Nutrition Monitoring Div. 1986, pp. 115-153.

* cited by examiner

MINERAL FORTIFIED WATER

CROSS REFERENCE TO RELATED APPLICATIONS

This application is a continuation of U.S. application Ser. No. 10/150,328, Filed May 16, 2002, now abandoned which claims priority to U.S. Provisional Application Ser. No. 60/294,760, filed May 31, 2001, both applications filed in the name of Haile Mehansho et al.

TECHNICAL FIELD

The present invention relates to water compositions supplemented with minerals such as calcium, iron, zinc, copper, manganese, iodine, magnesium, and mixtures thereof, or mixtures of two or more of these compounds that have excellent bioavailability. The water containing the minerals, especially iron and zinc compounds, does not have an off-flavor/aftertaste, is stable, and overcomes the problem of discoloration, precipitation and/or poor bioavailability caused by the addition of these minerals to water. The compositions can also optionally include vitamins, and other nutrients.

BACKGROUND OF THE INVENTION

In many countries, the average diet does not contain sufficient levels of necessary minerals and nutrients, such as, iron, zinc, iodine, vitamin A or the B vitamins. Iron deficiency is well documented, it is one of the few nutritional deficiencies in the U.S., and it is common in most developing countries. Recent evidence suggests that nutritional zinc deficiency may be common among the people of many developing countries where they subsist on diets of plant origin (e.g. cereal and legume). Marginal mineral deficiencies may be widespread even in the U.S. because of self-imposed dietary restrictions, use of alcohol and cereal proteins, and the increasing use of refined foods that decrease the intake of trace minerals.

Many mineral deficiencies can be overcome by taking supplements. Other methods of addressing these deficiencies include increasing the intake of foods naturally containing these minerals or fortifying food and beverage products. Usually, in countries where the people suffer from these deficiencies, the economy is such that providing minerals and vitamins as a supplement is expensive and presents significant distribution logistics problems. In addition, compliance, i.e., having the people take the vitamin and mineral supplements on a daily basis, is a serious problem. Accordingly, the delivery of minerals along with other vitamins and nutrients in a form that has high bioavailability and at the same time a non-objectionable taste and appearance, and in a form that would be consumed by a high proportion of the population at risk is desirable.

Vitamin and mineral fortified beverages and foods are known. Although substantial progress has been made in reducing iron deficiency by fortifying products such as infant formulas, breakfast cereals and chocolate drink powders, the formulations require milk that is often not available or affordable. To address the problem of iron and zinc deficiencies in the general population, efforts have been directed to formulating fruit-flavored dry beverage mixes supplemented with nutritional amounts (i.e., at least 5% of the USRDI) of zinc and iron with or without vitamins. Many fruit-flavored powdered beverages contain vitamins and/or minerals but seldom contain both zinc and iron at any significant level, see for example, Composition of Foods: Beverages, Agriculture Handbook No. 8 Series, Nutrition Monitoring Division, pgs 115–153.

There are well-recognized problems associated with adding both vitamins and minerals to beverages. Zinc supplements tend to have an objectionable taste, cause distortion of taste and cause mouth irritation, see for example U.S. Pat. No. 4,684,528 (Godfrey), issued Aug. 4, 1987. Iron supplements tend to discolor foodstuff, or to be organoleptically unsuitable. Moreover, it is particularly difficult to formulate products containing minerals and, in particular, mixtures of bioavailable iron and zinc. These minerals not only affects the organoleptic and aesthetic properties of beverages, but also undesirably affects the nutritional bioavailability of the minerals themselves and the stability of vitamins and flavors.

Several problems exist with delivering a mixture of minerals with or without vitamins in a beverage mix. A few of the problems are choosing mineral compounds which are organoleptically acceptable, bioavailable, cost effective and safe. For example, the water soluble iron and zinc compounds, which are the most bioavailable cause unacceptable metallic aftertaste and flavor changes. In addition, the soluble iron complexes often cause unacceptable color changes. Even further, the iron complexes themselves are often colored. This makes formulating a dry powder that has a uniform color distribution in the mix more difficult. Often the reconstituted beverage does not have a suitable color identifiable with the flavoring agent. If the color of the powder, reconstituted beverage or flavor of the beverage is substantially altered, the beverage will not be consumed. Color and taste are key to consumer acceptance.

Many iron sources that have been successful commercially, have been found to be unsatisfactory for use herein. For example, U.S. Pat. No. 4,786,578 (Nakel et al), issued November 1988, relates to the use of iron-sugar complexes suitable for supplementing fruit beverages. While this supplement may produce an acceptable taste in certain fruit flavored beverages, the supplement causes discoloration and consumer detectable differences in some colored beverages. Iron sources typically used to fortify chocolate milk were also found undesirable due to color problems and/or flavor problems.

It has further been found that iron is more bioavailable if administered in the form of chelates wherein the chelating ligands are amino acids or protein hydrolysates. See, for example, U.S. Pat. No. 3,969,540 (Jensen), issued Jul. 13, 1976 and U.S. Pat. No. 4,020,158 (Ashmead), issued Apr. 26, 1977. These chelated iron compounds are known in the art by various names such as iron proteinates, iron amino acid chelates and peptide or polypeptide chelates. These will be referred to herein simply as "amino acid chelated irons." A particularly desirable amino acid chelated iron is FERROCHEL made by Albion Laboratories. FERROCHEL is a free flowing, fine granular powder that provides a high bioavailable source of ferrous iron that is typically complexed or chelated with the amino acid glycine.

Unfortunately, it has also been found that FERROCHEL, when added to water or other aqueous solutions, imparts relatively quickly a deep rusty yellow color. Such a color can change the color appearance the food or beverage to which FERROCHEL has been added. In the case of many foods and beverages, this color change would be unacceptable. It has been found that FERROCHEL causes unacceptable off-color development in various foods and beverages by interacting with dietary components such as the polyphenols and flavonoids. Furthermore, by accelerating the oxidative rancidity of fats and oils, FERROCHEL (like ferrous sulfate) has been found to cause off-flavor in foods and beverages.

One solution to delivering a mineral-fortified beverage is disclosed in PCT Publication WO 98/48648 (The Procter & Gamble Company), published Nov. 5, 1998, which teaches a dry free-flowing beverage composition that when reconstituted with water has a desirable color and is free of undesirable aftertaste. The dry free-flowing beverage composition contains from about 5% to about 100% of the USRDI of iron, optionally from about 5% to about 100% of the USRDI of zinc, from about 0.001% to about 0.5% of a coloring agent, and from about 0.001% to about 10% of a flavoring agent. An edible acid sufficient to lower the pH to between 3 and 4.5 in the finished beverage is added. As can be appreciated, some of the additives are nutrients, while others are used to mask the taste and off-color caused by adding minerals to an aqueous solution.

An even greater challenge has been faced in providing a mineral fortified drinking water that contains a bioavailable source of iron or zinc mineral. A drinking water, as opposed to a beverage, should contain water as its main ingredient, and which should have the taste and appearance of pure water. Fortification of drinking water with soluble, stable and bioavailable minerals (e.g. iron, zinc) has been a challenge. For instance, when the soluble form of iron (ferrous iron) is added to regular water, it rapidly oxidizes to the insoluble trivalent form, which is ferric iron. Subsequently, the ferric iron combines with hydroxide ions to form iron hydroxide (yellow colored), which later converts to ferric oxide, a red, powdery precipitate called "rust." Thus, it is well known fact that natural water not only oxidizes iron from ferrous to ferric moieties, but also causes (a) the development of undesirable color (yellowish-rusty), (b) poor solubility demonstrated by precipitation and increased turbidity, (c) compromised bioavailability and (b) co-precipitation of other minerals (e.g. zinc, magnesium, calcium) and phosphate.

The behavior of such nutritionally important minerals in natural water (e.g. lakes, streams, rivers and oceans) is due to the oxidizing nature of the natural water. Most fresh water and lakes have a pH range from pH 5 to about 9. Furthermore, they contain not only dissolved oxygen but also other electron accepting species (iron-oxidizing) such as nitrates, manganese (IV), chloride ions. Both the pH range and the presence of the electron accepting species makes natural water an oxidizing media. Thus, it favors poor solubility, off-color development and compromised bioavailability and stability. In fact, the ability (tendency) of natural water to act as an oxidizing media is determined by measuring the Redox potential (Eh) in millivolts (mV). The redox potential for the different species of iron is defined by (a) Eh-pH diagram and (b) Nernest's equation: $Eh=Eo+0.059/n \log [\text{oxidized species}]/[\text{reduced species}]$, where Eh=observed electrode potential, Eo=standard electrode potential, n=number of electrons transferred. Under normal condition, water has relatively high redox potential (>300 mV), which is an indicator of highly oxidizing environment. This is primarily due to the presence of various electron acceptors (oxidizing agents), which include ozone, chlorine, oxygen, nitrates and manganese (1V).

Hence, there is a tendency for iron to turn rusty and precipitate as a result of the oxidizing nature of the water, and to develop a metallic off-taste that is attributed to free iron ions in the water. Since drinking waters should not have perceptible flavors or colors, the development of unacceptable iron coloration, poor solubility, or metallic taste in a drinking water cannot be masked over.

Attempts to provide an iron-containing drinking water in the past have shown limited success. FR Patent publication 2,461,463, published Feb. 6, 1981, discloses a procedure for preparing and stabilizing an iron-containing mineral water by adding an ascorbic acid, or salt thereof, reducing agent, where the weight ratio of ascorbic acid to ferrous ion is from about 2.5–6.5. The reducing agent is added to reduce any ferric ions to the ferrous state, which was believed to be the active bioavailable state of iron.

Further, German Patent No. 19,628,575, published Jan. 29, 1998, discloses drinking water or mineral water such as coffee, fruit teas or soft drinks, containing ferrous iron and an excess of organic or inorganic dietary acids to reduce the water pH to the range of 2–5. Iron gluconate and iron sulfate were disclosed as the added iron source. The resulting acid flavor of these waters was then neutralized by the addition of flavors, sugar and/or sweetener.

Accordingly, there exists a need for a water composition fortified with a nutritional amount of minerals, that is, metal ions, which is palatable and does not have a disagreeable aftertaste while preserving the bioavailability of the metal ions. It is preferred that these compositions have no metallic taste or aftertaste, without the use of any flavor or sweetener. It is desired that these compositions have an acceptable clarity and color, and preferably they are clear and colorless. Moreover, there is a need for water compositions that have a reducing environment, that is, low redox potential values. This would allow for the production of a water composition that maintains metal ions substantially in their reduced state through redox modulation, and wherein the water comprises low levels of the most dominant redox-active species, dissolved oxygen. These and many more advantages are provided by the present invention.

SUMMARY OF THE INVENTION

In one aspect of the present invention there is provided a mineral fortified water composition that is fortified with at least one mineral and has a pH between about 2.5 and 9.5, preferably between about 5.0 and 9.5. The water composition has a redox potential that satisfies the following equation:

$$0 \geq RP-(A-B*pH)$$

wherein RP is the redox potential in millivolts of the mineral containing water composition, pH is the pH of the mineral-containing water composition. In this equation, A is 400 and B is 20, preferably, A is 380 and B is 18, more preferably A is 360 and B is 16, and even more preferably A is 340 and B 14. The mineral is preferably selected from the group consisting of calcium, iron, zinc, copper, manganese, iodine, magnesium, and mixtures thereof.

In another aspect of the present invention the mineral-fortified water composition is substantially free of a flavor or sweetener compound, and has: no metallic taste or aftertaste; a Hunter calorimetric "b" reading of less than 5.0; and an NTU turbidity value of less than 5.0, preferably less than 2.0. Preferably, the mineral is either water soluble or a water-dispersible compound having a dispersed particle size of less than about 100 nanometers.

In yet another aspect of the present invention the mineral fortified water composition may further comprise less than 4 ppm oxygen, preferably less than 3 ppm oxygen, and more preferably less than 2 ppm oxygen, and even more preferably an oxygen scavenging agent is provided. The mineral-fortified water composition may be substantially free of a redox potential increasing agent selected from an oxoanion salt, a halide gas and an organic material.

In one preferred embodiment of the present invention the mineral-fortified water composition further comprises an additive selected from the group consisting of vitamin A, vitamin C, vitamin E, niacin, thiamin, vitamin B6, vitamin B2, vitamin B 12, folic acid, selenium, pantathonic acid, and mixtures thereof.

In yet another aspect of the present invention there is provided a packaged water, comprising: a mineral-fortified water composition according to the present invention; and an oxygen-barrier package.

There is also provided herein a process for making a clear, colorless, mineral-fortified water composition, comprising the steps of: providing a deionized and/or distilled water source; deoxygenating the water, to reduce free oxygen level in the water to less than 3 ppm; and adding a mineral compound to the deoxygenated water at a concentration of at least about 5 ppm. Preferably the mineral compound is selected from a water soluble mineral compound, a water-dispersible particulate mineral compound, and mixtures thereof. The water composition may have a Hunter calorimetric "b" reading of less than 5.0, an NTU turbidity value of less than 5.0. In this process the mineral compound is preferably selected from the group consisting of calcium, iron, zinc, copper, manganese, iodine, magnesium, and mixtures thereof.

As disclosed herein, compositions and methods have now been found to make a water compositions containing particular minerals that are soluble and at the same time have acceptable taste and leaving no undesirable aftertaste without compromising stability and bioavailability. This invention has also been found to make water compositions that contain particular mineral sources having substantially clear and colorless appearance. More specifically, the inventors have surprisingly found that minerals, for example, ferrous ions ($Fe^{2+}$), can be stabilized through redox modulation. The present invention involves modifying the natural water redox potential from "oxidizing/electron accepting" to "reducing/electron donating" by reducing the concentration of, and preferably eliminating, compounds/species that have higher redox potential than that of the added minerals. These include ozone, oxygen, hypochlorite, chlorine, nitrate/nitrite and manganese (IV).

DETAILED DESCRIPTION OF THE INVENTION

As used herein, the term "comprising" means various components conjointly employed in the preparation of the water compositions of the present invention. Accordingly, the terms "consisting essentially of" and "consisting of" are embodied in the term "comprising".

As used herein, the terms "per serving", "per unit serving" or "serving size"-refers to 250 milliliters of the finished water composition or beverage. M The terms "water composition" and "beverage" are used interchangeably herein and they are intended to have the same meaning.

As used herein, the terms "substantially free of" a particular component means that the final water composition contains less than about 1% of the subject component, preferably less than about 0.5% of the subject component, more preferably less than about 0.1% of the subject component, even more preferably, and most preferably less than about 0.01% of the subject component, by weight. As used herein, all parts, percentages and ratios are based on weight unless otherwise specified.

The U.S. Recommended Daily Intake (USRDI) for vitamins and minerals are defined and set forth in the Recommended Daily Dietary Allowance-Food and Nutrition Board, National Academy of Sciences National Research Council, for a serving size of 250 mls of the water composition. As used herein, a nutritionally supplemental amount of minerals is at least about 5%, preferably from about 10% to about 200%, of the USRDI of such minerals. As used herein, a nutritionally supplemental amount of vitamins is at least about 5%, preferably from about 20% to about 200%, more preferably from about 25% to 100%, of the USRDI of such vitamins.

It is recognized, however, that the preferred daily intake of any vitamin or mineral may vary with the user. For example, persons suffering with anemia may require an increased intake of iron. Persons suffering from poor appetite, growth, performance and health may be suffering from mineral and vitamin deficiencies or who have poor diets will require more nutrients, for example, zinc, iodine, vitamin A, vitamin C and the B-vitamins (e.g. folate, $B_{12}$, $B_6$), particularly women of child bearing age, physically active adults and growing children in developing countries. Such matters are familiar to physicians and nutritional experts, and usage of the compositions of the present invention may be adjusted accordingly.

Mineral Supplement Source

The water compositions of the present invention contain a mineral compound that is selected from the group consisting of calcium, iron, zinc, copper, manganese, iodine, magnesium, and mixtures thereof.

The mineral fortified compositions of the present invention typically contain at least about 1 ppm of the mineral compound, or an amount sufficient to deliver about 5% to about 100% USRDI of the mineral (based per serving). Preferably the compositions contain from about 15% to about 50%, and most preferably about 20% to about 40% of the USRDI for the added mineral.

The inventors have discovered that a key factor in maintaining the stability of the ferrous state in the water is the control of the redox potential (reducing and oxidizing power) of the water. The various ions compounds in water will undergo oxidation-reduction reactions, in an equilibrium state that is dictated by the redox potential of the water system. In the case of iron, ferric iron (Fe3+) can be reduced chemically to ferrous iron (Fe2+) in an equilibrium state, if a redox potential of 770 mV or less is attained and maintained. Preferably, the redox potential is maintained below about 700 mV, more preferably below 500 mV, even more preferably below 300 mV, yet even below 200 mV, and most preferably below 150 mV.

As will be understood by those in the art, The redox potential of a water composition is generally inversely proportional to the pH of the composition. Thus, it has been determined that as the pH of the water composition decreases a higher level of redox potential can be tolerated while simultaneously maintaining the mineral compositions in their reduced state. This relationship can be best described by the equation (or it may be called an inequality):

In one embodiment of the present invention, the water composition may be substantially free of a flavor or sweetener compound. In such a composition, the water composition may have no metallic taste or after-taste, a Hunter colorimetric "b" reading of less than about 5.0, and an NTU turbidity value of less than 5.0. The pH of such a composition may be from about 4.0 to about 9.5.

$$0 \geq RP - (A - B*pH)$$

Where RP is the measured redox potential in millivolts of the mineral containing water composition, pH is the pH of the mineral containing water composition, A is 400 and B is 20, preferably A is 380 and B is 18, more preferably A is 360 and B is 16, and even more preferably A is 340 and B 14. All redox potential measurements discussed herein are made with a silver/silver chloride electrode filled with a saturated KCl solution. And all redox potential measurements are taken at room temperature and standard pressure.

Iron Source

The iron compound of the present invention is selected from a water-soluble iron compound, a water-dispersible particulate iron compound, and mixtures thereof. In addition, the iron compound of the present invention is preferably selected from a complexed iron compound, a chelated iron compound, an encapsulated iron compound, and mixtures thereof. The iron compound should also be bioavailable to provide the health benefits herein before described.

A preferred iron compound can be added to a water source to provide an iron-fortified water that reduces, and preferably eliminates the metallic taste and aftertaste that is typical of iron-containing waters and beverages. The elimination of the metallic taste can be achieved by encapsulating the iron compound. The metallic taste can also be eliminated by binding the iron into a stable compound by complexing or chelating with a suitable ligand that does not permit the iron to be freely associated in the water.

Preferred iron compound forms also include encapsulates and complexes that have a dispersed particle size in the water that is small enough to be barely visible in solution. Preferably, the dispersed particle size is about 100 nanometers (nm) or less, and more preferably about 80 nm or less. A particularly preferred iron sources are inert and/or stabilized, micron-sized iron complexed with (a) pyrophosphate/orthophosphate as in SunActive iron (Taiyo Company, Japan) and (b) EDTA as in Na Fe(III)EDTA.

A iron compound form useful for the purpose of the present invention is ferrous sulfate encapsulated in a hydrogenated soybean oil matrix, for example, CAP-SHURE, available from Balchem Corp., Slate Hill, N.Y., and chelated iron (i.e., ferrous) wherein the chelating agent is an amino acid, for example, FERROCHEL AMINO ACID CHELATE, available from Albion Laboratories, Inc., Clearfield, Utah. Other solid fats can be used to encapsulate the ferric sulfate, such as tristearin, hydrogenated corn oil, cottonseed oil, sunflower oil, tallow and lard.

Ferrous amino acid chelates particularly suitable as highly bioavailable amino acid chelated irons for use in the present invention are those having a ligand to metal ratio of at least 2:1. For example, suitable ferrous amino acid chelates having a ligand to metal mole ratio of two (2) are those of formula "Fe(L)2", where L is an alpha amino acid, dipeptide, tripeptide or quadrapeptide reacting ligand. Thus, L can be any reacting ligand that is a naturally occurring alpha amino acid selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these alpha amino acids. See U.S. Pat. No. 3,969,540 (Jensen), issued Jul. 13, 1976 and U.S. Pat. No. 4,020,158 (Ashmead), issued Apr. 26, 1977; U.S. Pat. No. 4,863,898 (Ashmead et al), issued Sep. 5, 1989; U.S. Pat. No. 4,830,716 (Ashmead), issued May 16, 1989; and U.S. Pat. No. 4,599,152 (Ashmead), issued Jul. 8, 1986, all of which are incorporated by reference. Particularly preferred ferrous amino acid chelates are those where the reacting ligands are glycine, lysine, and leucine. Most preferred is the ferrous amino acid chelate sold under the Trade name FERROCHEL by Albion Laboratories where the reacting ligand is glycine.

Ferrous iron is typically better utilized by the body than ferric iron. Highly bioavailable food grade ferrous salts that can be used in the present invention include ferrous sulfate, ferrous fumarate, ferrous succinate, ferrous gluconate, ferrous lactate, ferrous tartrate, ferrous citrate, ferrous amino acid chelates, as well as mixtures of these ferrous salts. Certain ferric salts can also provide a highly bioavailable source of iron. Highly bioavailable food grade ferric salts are ferric saccharate, ferric ammonium citrate, ferric citrate, ferric sulfate, ferric chloride, as well as mixtures of these ferric salts.

Other bioavailable sources of iron particularly suitable for fortifying water of the present invention include certain iron-sugar-carboxylate complexes. In these iron-sugar-carboxylate complexes, the carboxylate provides the counterion for the ferrous (preferred) or ferric iron. The overall synthesis of these iron-sugar-carboxylate complexes involves the formation of a calcium-sugar moiety in aqueous media (for example, by reacting calcium hydroxide with a sugar, reacting the iron source (such as ferrous ammonium sulfate) with the calcium-sugar moiety in aqueous media to provide an iron-sugar moiety, and neutralizing the reaction system with a carboxylic acid (the "carboxylate counterion") to provide the desired iron-sugar-carboxylate complex. Sugars that can be used to prepare the calcium-sugar moiety include any of the ingestible saccharidic materials, and mixtures thereof, such as glucose, sucrose and fructose, marmose, galactose, lactose, and maltose, with sucrose and fructose being the more preferred. The carboxylic acid providing the "carboxylate counterion" can be any ingestible carboxylic acid such as citric acid, malic acid, tartaric acid, lactic acid, succinic acid, propionic acid, etc., as well as mixtures of these acids.

These iron-sugar-carboxylate complexes can be prepared in the manner described in U.S. Pat. Nos. 4,786,510 and 4,786,518 (Nakel et al) issued Nov. 22, 1988, both of which are incorporated by reference. These materials are referred to as "complexes," but they can, in fact, exist in solution as complicated, highly hydrated, protected colloids; the term "complex" is used for the purpose of simplicity.

The amount of iron compound added to the beverage dry mix can vary widely depending upon the level of supplementation desired in the final product and the targeted consumer. The USRDI for iron generally range from 10 mg per 6 kg female or male to 18 mg per 54–58 kg female, depending somewhat on age. The iron fortified compositions of the present invention typically contain at least about 1 ppm of iron compound, sufficient to deliver about 5% to about 100% USRDI of iron (based per serving) to account for iron that is available from other dietary sources (assuming a reasonably balanced diet). Preferably the compositions contain from about 15% to about 50%, and most preferably about 20% to about 40% of the USRDI for iron.

Zinc Source

The zinc compounds used in the present invention can be in any of the commonly used forms such as the sulfate, chloride, acetate, gluconate, ascorbate, citrate, aspartate, picolinate, amino acid chelated zinc, as well as zinc oxide.

It has been found, however, because of taste reasons, that amino acid chelated zinc sources are particularly preferred. The zinc-fortified composition of the present invention typically contains at least 5 ppm of zinc. Preferably, the water compositions contains zinc compound to provide about 5% to about 100% USRDI of zinc (based per serving) to account for that which is available from other dietary sources (assuming a reasonably balanced diet). Preferably the compositions contain from about 15% to about 50% and, preferably from about 25% to 40% of the USRDI for zinc.

The zinc compound can also be an encapsultated zinc compound, utilizing encapsulating materials described herein above for the iron compound.

Preferred zinc compound forms also include encapsulates and complexes that have a dispersed particle size in the water that is small enough to be barely visible in solution. Additionally, the preferred zinc sources are inert and/or stabilized, micron-sized zinc from zinc oxide in a dispersed particle size is about 100 nanometers (nm) or less, and more preferably about 80 nm or less.

Other Mineral Sources

Nutritionally supplemental amounts of other minerals for incorporation into the water composition include, but are not limited to, calcium, magnesium, manganese, iodine and copper. Any water-soluble salt of these minerals can be used, e.g., copper sulfate, copper gluconate, copper citrate and amino acid chelated copper. A preferred calcium source is a calcium citrate malate composition described in U.S. Pat. No. 4,789,510, U.S. Pat. No. 4,786,518 and U.S. Pat. No. 4,822,847. Calcium in the form of calcium phosphate, calcium carbonate, calcium oxide and calcium hydroxide in micron-sized particles in a dispersed particle size is about 100 nanometers (nm) or less, and more preferably about 80 nm or less. Additional calcium sources include calcium citrate, calcium lactate and amino acid chelated calcium.

The USRDI for calcium will range from 360 mg per 6 kg for infants to 1200 mg per 54–58 kg female, depending somewhat on age. Moreover, it can be difficult to supplement beverages with more than 20–30% USRDI of calcium (based per serving) without encountering precipitation and or organoleptic problems. However, this level of supplementation is equivalent to that provided by cow's milk, and is therefore acceptable.

Among the magnesium sources, the preferred are magnesium oxide and magnesium phosphate in micron-sized particles in a dispersed particle size is about 100 nanometers (nm) or less, and more preferably about 80 nm or less. Commercial sources of iodine, preferably as an encapsulated potassium iodide are used herein. Other sources of iodine include iodine containing salts, e.g., sodium iodide, potassium iodide, potassium iodate, sodium iodate, or mixtures thereof. These salts may be encapsulated and the current USRDI for iodine is 150 μg. Manganese sources are commercially available and will be known to those in the art.

Redox Modulators

Electron donating/reducing Compounds: These include redox modulator compounds that have the property (redox potential below that of ferric iron) of converting the oxidizing environment of regular water to reducing environment. Normally they have electron donating functional groups. These electron donating compounds keep (a) the iron in a reduced and soluble form, (b) prevent other minerals such as zinc from precipitating and (c) vitamins and flavors from degradation through the process of reducing the redox potential of the vehicle water. Such compounds are those with a redox potential below that of ferric iron (770 mV).

These may include ascorbic acid, ascorbyl palmitate, sodium bisulfite, erythorbic acid, sulfhydryl containing amino acids/peptides/proteins, polyphenols/flavonoids, soluble dietary fibers (e.g. arabinogalactan) as well as mixtures of these reducing agents. The preferred electron donating/reducing compounds are ascorbic acid, erythorbic acid and sodium bisulfites.

Mineral Chelating Compounds: These include ligands that have two or more electron donating groups. The preferred are EDTA, citrate, tartarate and polyphosphates.

Other Nutrients

The water compositions of the present invention can optionally contain other nutrients in addition to minerals, for example vitamin C, vitamin E, vitamin A, niacin, thiamin, vitamin B6, vitamin B2, vitamin B 12, folic acid, selenium, pantathonic acid, and mixtures thereof.

Current USRDI values for most healthy adults are generally: vitamin C (60 mg), vitamin A as retinol (1 mg) or as β-carotene (3 mg), vitamin $B_2$ (1.7 mg), niacin (20 mg), thiamin (1.5 mg), vitamin $B_6$ (2.0 mg), folic acid (0.4 mg), vitamin B12 (6 μg), and vitamin E (30 international units).

Commercially available sources of vitamin C can be used herein. Encapsulated ascorbic acid and edible salts of ascorbic acid can also be used. Typically, from about 5% to about 200% of the USRDI of vitamin C is used in the water composition. Preferably from about 25% to about 150%, and most preferably about 100% of the USRD1 for vitamin C is used in 35 g of the water composition.

Commercially available vitamin A sources can also be incorporated into the water composition. A single serving preferably contains from about 5% to about 100% and most preferably contains about 25% of the USRDI of vitamin A. Vitamin A can be provided, for example, as vitamin A palmitate (retinol palmitate) and/or as beta-carotene. It can be as an oil, beadlets or encapsulated. As used herein, "vitamin A" includes vitamin A, β-carotene, retinol palmitate and retinol acetate.

Commercially available sources of vitamin $B_2$ (riboflavin) can be used herein. The resulting water composition preferably contains (per serving) from about 5% to about 200% and most preferably contains from about 15% to about 35% of the USRDI of vitamin $B_2$. Vitamin $B_2$ is also called riboflavin.

Nutritionally supplemental amounts of other vitamins for incorporation into the water composition include, but are not limited to, vitamins $B_6$ and $B_{12}$, folic acid, niacin, pantothenic acid, folic acid, and vitamins D and E. Typically, the water composition contains at least 5%, preferably at least 25%, and most preferably at least 35% of the USRDI for these vitamins. Other vitamins can also be incorporated into the water composition depending on the nutritional needs of the consumers to which the water product is directed.

Coloring Agent

Small amounts of coloring agent, such as the FD&C dyes (e.g. yellow #5, blue #2, red #40) and/or FD&C lakes can be optionally used. Such coloring agents are added to the water for aesthetic reasons only, and are not required to mask an off color or precipitation caused by the iron compound. By adding the lakes to the other powdered ingredients, any particles, in particular any iron compound particles, are completely and uniformly colored and a uniformly colored beverage mix can be attained. Preferred Lake dyes that can be used in the present invention are the FDA approved Lake, such as Lake red #40, yellow #6, blue #1, and the like. Additionally, a mixture of FD&C dyes or a FD&C lake dye in combination with other conventional food and food colorants can be used. The exact amount of coloring agent used will vary, depending on the agents used and the intensity desired in the finished product. The amount can be readily determined by one skilled in the art. Generally the coloring agent should be present at a level of from about 0.0001% to about 0.5%, preferably from about 0.004% to about 0.1% by weight of the dry powder. When the beverage is lemon flavored or yellow in color, riboflavin can be used as the coloring agent. P-carotene and riboflavin both contribute to the color of orange beverages.

Flavoring Agent

The water can optionally comprise a flavoring agent consisting of any natural or synthetically prepared fruit or botanical flavors or with mixtures of botanical flavors and fruit juice blends. Such flavoring agents are added to the water for aesthetic reasons only, and are not required to mask an metallic taste or after-taste caused by the iron compound. Suitable natural or artificial fruit flavors include lemon, orange, grapefruit, strawberry, banana, pear, kiwi, grape, apple, lemon, mango, pineapple, passion fruit, raspberry and mixtures thereof. Suitable botanical flavors include jamaica, marigold, chrysanthemum, tea, chamomile, ginger, valerian, yohimbe, hops, eriodictyon, ginseng, bilberry, rice, red wine, mango, peony, lemon balm, nut gall, oak chip, lavender, walnut, gentiam, luo han guo, cinnamon, angelica, aloe, agrimony, yarrow and mixtures thereof. From about 0.01% to about 10%, preferably from about 0.02% to 8%, of these flavors can be used. Dry fruit juices can also be used as flavorants. The actual amount of flavoring agent will depend on the type of flavoring agent used and the amount of flavor desired in the finished beverage. Other flavor enhancers, as well as flavorants such as chocolate, vanilla, etc., can also be used.

Acid Component

An edible acid can optionally be added to the water composition of the present invention. Such edible acids are added to the water for aesthetic reasons only, and are not required to mask an metallic taste or after-taste caused by the iron compound. These acids may be used alone or in combination. The edible acid can be selected from tannic acid, malic acid, tartaric acid, citric acid, malic acid, phosphoric acid, acetic acid, lactic acid, maleic acid, and mixtures thereof.

Sweetener

The water of the present invention can optionally comprise a sweetener. Such sweetening agents are added to the water for aesthetic reasons only, and are not required to mask an metallic taste or after-taste caused by the iron compound. Suitable particulate sugars can be granulated or powdered, and can include sucrose, fructose, dextrose, maltose, lactose and mixtures thereof. Most preferred is sucrose. Artificial sweeteners can also be used. Often gums, pectins and other thickeners are used with artificial sweeteners to act as bulking agents and provide texture to the reconstituted dry beverage. Mixtures of sugars and artificial sweeteners can be used.

In addition to the added particulate sugar in the dry beverage mix, other natural or artificial sweeteners can also be incorporated therein. Other suitable sweeteners include saccharin, cyclamates, acesulfwn-K, L-aspartyl-L-phenylaianine lower alkyl ester sweeteners (e.g. aspartame), L-aspartyl-Dalanine amides disclosed in U.S. Pat. No. 4,411,925 to Brennan et al., L-aspartyl-D-serine amides disclosed in U.S. Pat. No. 4,399,163 to Brennan et al., L-aspartyl-L-1-hydroxymethylalkaneamide sweeteners disclosed in U.S. Pat. No. 4,338,346 to Brand, L-aspartyl-1-hydroxyethyalkaneamide sweeteners disclosed in U.S. Pat. No. 4,423,029 to Rizzi, L-aspartyl-D-phenylglycine ester and amide sweeteners disclosed in European Patent Application 168,112 to J. M. Janusz, published Jan. 15, 1986, and the like. A particularly preferred optional and additional sweetener is aspartame.

Antioxidant

The water can further comprise a food grade antioxidant in an amount sufficient to inhibit oxidation of the aforementioned materials, especially lipids. Excessive oxidation can contribute to off-flavor development of these ingredients. Excessive oxidation can also lead to degradation and inactivation of any ascorbic acid or other easily oxidized vitamin or minerals in the mix.

Known or conventional food grade antioxidants can be used. Such food grade antioxidants include, but are not limited to, butylated hydroxyanisole (BHA), butylated hydroxytoluene (BHT), and mixtures thereof. Selection of an effective amount of a food grade antioxidant is easily determined by the skilled artisan. Limitations on such amounts or concentrations are normally subject to government regulations.

Preparation of the Water Composition

The water compositions of the present invention can be prepared from a variety of water sources. Most preferred are deionized water, softened water, water treated by commercially available reverse osmosis processes, or distilled water.

The present invention provides a process step wherein fortification of water with minerals and vitamins is accomplished without the development of undesirable color, solubility, flavor and bioavailability through redox modulation, which in this case is reducing the redox potential. A preferred treatment comprises removing and or scavenging the main species in water that contributes to its high redox potential, which is the dissolved oxygen. The process includes deoxygenating the water to reduce the concentration of oxygen in the water, or to eliminate all dissolved oxygen. Preferred methods of deoxygenating the water include stripping of oxygen (and other dissolved gases) with carbon dioxide or other inert gas. Preferred as inert gases, such as nitrogen gas. Oxygen gas can also be reduced by heating the water to high temperatures, at which the solubility is reduced. Another method comprises adding reducing agents to the water, such as ascorbic acid. The oxygen level in the source water is typically reduced to less than 5 ppm, preferably less than 3 ppm, and more preferably less than 1 ppm.

The deoxygenation process typically also removes other redox potential increasing agent, such as any halide gas, like chlorine gas, as well as volatile organic materials. Additionally, the water used is treated to have minimal amount of the other electron acceptors that have greater redox potential than that of iron. These include ozone, chloride and hypochlotates, nitrates and nitrites as well as manganese (IV).

The mineral compound, is then admixed at the desired nutrient level, typically under mild stirring. Preferably, the admixing step is conducted under an inert gas blanket to exclude outside air and oxygen from the product.

Finally, the water is packaged into glass or plastic bottles, or other suitable container. Preferably, the plastic material of the bottle is an oxygen-impermeable barrier. Such oxygen-impermeable bottles are commercially available and will be known to those skilled in the art.

EXAMPLES

The following are non-limiting examples of compositions used in accordance with the present invention. The compositions are prepared utilizing conventional methods. The following examples are provided to illustrate the invention and are not intended to limit the scope thereof in any manner.

Example 1

A composition is prepared having the following ingredients in the indicated amounts:

| Ingredient | Amount |
| --- | --- |
| SunActive Iron (8.0% Fe) | 1.8 mg |
| Zinc bis-glycinate (21.8% Zn) | 1.5 mg |
| Vitamin C as sodium ascorbate (88.9% Vit. C) | 60 mg |
| Vitamin B6 | 0.2 mg |
| Vitamin B12 (1% Vit. B12) | 0.6 microgm |
| Citric Acid | .01 gm |
| Folic Acid | 40 microgm |
| Reverse Osmosis/Millipore (Milli-Q) Water | 250 ml |

Upon preparing the composition, the fortified and flavored water had no off-color or rusty color, no precipitation or turbidity, and low redox and not significantly different in metallic taste or after-taste when compared to the vehicle alone (Reverse Osmosis/Millipore (Milli-Q) Water).

Example 2

A mineral fortified water composition according to the present invention, and more specifically, according to Example 1, was compared to common tap water, distilled water treated by a common Reverse Osmosis process, and a variety of commercially available bottle waters. Some of the commercially available bottled waters were supplemented with vitamins. Using the measured values for the Redox potential (listed as "mV" in Table 2A) and pH, the inequality $0 \geq RP-(A-B*pH)$ was calculated for various values of "A" and "B". The results of these calculations are givenm in Table 2A. Table 2B gives additional data from the comparison of these products.

TABLE 2A

|  | mV | PH | A = 400 B = 20 | A = 380 B = 18 | A = 360 B = 16 | A = 340 B = 14 |
| --- | --- | --- | --- | --- | --- | --- |
| Water of Example 1 | 192 | 4.85 | −111 | −101 | −90 | −80 |
| Tap water | 316 | 8.95 | 95 | 97 | 99 | 101 |
| Reverse Osmosis water | 360 | 5.75 | 75 | 84 | 92 | 101 |
| Fresh milliQ[1] | 320 | 6.52 | 50 | 57 | 64 | 71 |
| Stored milliQ | 336 | 5.74 | 51 | 59 | 68 | 76 |
| Aquafina Plus Calcium[2] | 403 | 4.21 | 87 | 99 | 110 | 122 |
| Aquafina Multi-V | 365 | 3.96 | 44 | 56 | 68 | 80 |
| Aquafina Daily C | 338 | 4.04 | 19 | 31 | 43 | 55 |
| Hansen Energy[3] | 406 | 3.76 | 81 | 94 | 106 | 119 |
| Propel Fitness[4] | 384 | 3.47 | 53 | 66 | 80 | 93 |
| Reebok Fitness[5] | 432 | 3.12 | 94 | 108 | 122 | 136 |
| Glaceau Fruitwater[6] | 427 | 3.47 | 96 | 109 | 123 | 136 |

TABLE 2B

|  | Dissolved Oxygen | Turbidity | Hunter "b" |
| --- | --- | --- | --- |
| Water of Example 1 | 1.15 | 0.643 | −0.12 |
| Tap water | 8.02 | 0.447 | −0.24 |
| Reverse Osmosis water | 6.51 | 0.4 | −0.26 |
| Fresh milliQ[1] | 4 | 0.435 | −0.26 |
| Stored milliQ | 9.29 | 0.476 | −0.23 |
| Aquafina Plus Calcium[2] | 1.15 | 0.492 | −0.24 |
| Aquafina Multi-V | 0.22 | 7.48 | −0.12 |
| Aquafina Daily C | 0.17 | 0.612 | −0.14 |
| Hansen Energy[3] | 7.06 | 0.671 | −0.25 |
| Propel Fitness[4] | 5.69 | 4.96 | −0.17 |
| Reebok Fitness[5] | 3.63 | 0.575 | −0.17 |
| Glaceau Fruitwater[6] | 7.47 | 0.628 | −0.24 |

[1]MilliQ is analytical distilled reverse osmosis water from Millipore Academic Ultrapure water purification system
[2]Aquafina is a commercially available bottled water product produced by Pepsi
[3]Hansen Energy is a commercially available bottled water product produced by Hansen Beverage Company
[4]Propel Fitness is a commercially available bottled water product produced by The Gatorade Company
[5]Reebok Fitness is a commercially available bottled water product produced by Cleary Canadian Beverage Corporation
[6]Glaceau Fruitwater is a commercially available bottled water product produced by Energy Brands, Inc.

What is claimed is:

1. A mineral fortified water composition that is fortified with at least one mineral and has a pH between about 4.0 and 9.5, the water composition has a redox potential that satisfies the following equation:

$$0 \geq RP - (A - B*pH)$$

wherein RP is the measured redox potential in millivolts of the mineral-containing water composition, pH is the pH of the mineral-containing water composition. A is 400 and B is 20, wherein said mineral fortified water is suitable for ingestion and is substantially free of a flavor or sweetener compound, wherein at least one of the minerals is an iron compound selected from the group consisting of a water-soluble iron compound, a water-dispersible particulate iron compound, and mixtures thereof and wherein said composition further comprises at least 2 ppm of a zinc compound selected from the group consisting of a complexed zinc compound, a chelated zinc compound, and an encapsulated zinc compound, and mixtures thereof.

2. A mineral fortified water composition that is fortified with at least one mineral and has a pH between about 4.0 and 9.5, the water composition has a redox potential that satisfies the following equation:

$$0 \geq RP - (A - B*pH)$$

wherein RP is the measured redox potential in millivolts of the mineral-containing water composition, pH is the pH of the mineral-containing water composition, A is 400 and B is 20, wherein said mineral fortified water is suitable for ingestion and is substantially free of a flavor or sweetener compound and wherein said composition further comprises an additive selected from the group consisting of vitamin A, vitamin C, vitamin E, niacin, thiamin, vitamin B6, vitamin B2, vitamin B12, folic acid, selenium, pantathonic acid, and mixtures thereof.

3. A packaged water, comprising:
a. a mineral fortified water composition that is fortified with at least one mineral and has a pH between about 4.0 and 9.5, the water composition has a redox potential that satisfies the following equation:

$$0 \geq RP - (A - B*pH)$$

wherein RP is the measured redox potential in millivolts of the mineral-containing water composition, pH is the pH of the mineral-containing water composition, A is 400 and B is 20, wherein said mineral fortified water is suitable for ingestion and is substantially free of a flavor or sweetener compound;

b. an oxynen-barrier package; and wherein said composition further comprises an additive selected from the group consisting of vitamin A, vitamin C, vitamin E, niacin, thiamin, vitamin B6, vitamin B2, vitamin B12, folic acid, selenium, pantathonic acid, and mixtures thereof.

* * * * *